United States Patent [19]
Fields

[11] Patent Number: 5,833,842
[45] Date of Patent: *Nov. 10, 1998

[54] APPARATUS FOR DISINFECTING WATER IN HOT WATER RECIRCULATION SYSTEMS

[75] Inventor: Howard Jay Fields, Mill Valley, Calif.

[73] Assignee: CW Technologies, Inc., Sausalito, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 746,577

[22] Filed: Nov. 14, 1996

[51] Int. Cl.⁶ .................. C02F 1/461; C02F 1/48
[52] U.S. Cl. .............. 210/85; 204/229; 204/275; 210/87; 210/94; 210/143; 210/243; 422/186.04
[58] Field of Search ................... 210/85, 94, 97, 210/143, 192, 243, 764, 748, 87; 204/228, 229, 275, 280, 286, 293, 660, 661, 663, 667; 422/22, 186.04

[56] References Cited

U.S. PATENT DOCUMENTS

| | | |
|---|---|---|
| 2,061,323 | 11/1936 | Meinzer .................................. 422/22 |
| 3,841,483 | 10/1974 | Overton . |
| 4,121,991 | 10/1978 | Miller et al. . |
| 4,127,467 | 11/1978 | Smith . |
| 4,255,246 | 3/1981 | Davis et al. . |
| 4,525,272 | 6/1985 | Henson . |
| 4,680,114 | 7/1987 | Hayes . |
| 4,710,282 | 12/1987 | Chak et al. .............................. 204/229 |
| 4,713,170 | 12/1987 | Saibic . |
| 4,874,496 | 10/1989 | Chak et al. ............................. 204/229 |
| 4,908,109 | 3/1990 | Wright . |
| 4,936,979 | 6/1990 | Brown . |
| 5,034,110 | 7/1991 | Glore et al. . |
| 5,114,571 | 5/1992 | Pier et al. . |
| 5,217,626 | 6/1993 | Yahya et al. . |
| 5,227,052 | 7/1993 | Ilves ....................................... 210/243 |
| 5,314,589 | 5/1994 | Hawley . |
| 5,344,531 | 9/1994 | Saito et al. . |
| 5,364,512 | 11/1994 | Earl . |
| 5,543,040 | 8/1996 | Fite et al. ................................ 210/192 |
| 5,685,994 | 11/1997 | Johnson .................................. 210/748 |

Primary Examiner—Joseph W. Drodge
Attorney, Agent, or Firm—Thomas R. Lampe

[57] ABSTRACT

Apparatus for disinfecting water flowing through a water system including a water pipe includes a water bypass line having an inlet and outlet communicating with the water pipe. A wye connector is positioned in the water bypass line and includes a closed interior chamber which receives water from the water bypass line and promotes water turbulence. Electrode elements project into the chamber which are electrically connected to a power supply which imparts electrical energy to the electrode elements and causes the release of ions from the electrode elements into the turbulent water within the wye chamber.

13 Claims, 16 Drawing Sheets

| Fig. 7A | Fig. 7D | Fig. 7G |
|---------|---------|---------|
| Fig. 7B | Fig. 7E | Fig. 7H |
| Fig. 7C | Fig. 7F | Fig. 7I |

Fig. 7

APPARATUS FOR DISINFECTING WATER IN HOT WATER RECIRCULATION SYSTEMS

TECHNICAL FIELD

This invention relates to apparatus for disinfecting water. More particularly, the apparatus is operatively associated with a hot or cold water system, an example being a water recirculation system employed in hospitals and other institutions, to disinfect the water recirculated therein.

BACKGROUND ART

The use of copper and silver to keep water free from bacteria and algae can be traced back to times prior to the Greco and Roman empires. Pioneers crossing the plains to settle the middle and western United States employed the same expedient. Unknown to our forefathers and the ancient cultures that preceded them was the scientific explanation of how the copper and silver coins kept their water pure. Quite simply, trace amounts of copper and/or silver in the form of positively charged ions (cations) are released when placed in water, the most basic of solvents on earth. These cations are attracted to negatively charged sites on the cell walls of micro organisms. When the amount of metal ions on the organisms reaches a critical quantity the cell is unable to receive proper nutrients which ultimately destroys its cellular protein and kills the organism.

A number of systems have been devised for treating water which employ electrically energized sacrificial electrodes to purify water. A search of the prior art located the following United States patents which are believed representative of the current state of the prior art in this field: U.S. Pat. No. 5,034,110, issued Jul. 23, 1991, U.S. Pat. No. 3,841,483, issued Oct. 15, 1974, U.S. Pat. No. 4,121,991, issued Oct. 24, 1978, U.S. Pat. No. 4,127,467, issued Nov. 28, 1978, U.S. Pat. No. 4,255,246, issued Mar. 10, 1981, U.S. Pat. No. 4,525,272, issued Jun. 25, 1985, U.S. Pat. No. 4,680,114, issued Jul. 14, 1987, U.S. Pat. No. 4,713,170, issued Dec. 15, 1987, U.S. Pat. No. 4,908,109, issued Mar. 13, 1990, U.S. Pat. No. 4,936,979, issued Jun. 26, 1990, U.S. Pat. No. 5,114,571, issued May 19, 1992, U.S. Pat. No. 5,217,626, issued U.S. Pat. No. Jun. 8, 1993, issued , U.S. Pat. No. 5,314,589, issued May 24, 1994, U.S. Pat. No. 5,344,531, issued Sep. 6, 1994, and U.S. Pat. No. 5,364,512, issued Nov. 15, 1994.

Typically, such systems are not appropriate, effective or efficient for treatment of either a cold water supply or hot water circulating through a hot water recirculation system. Hot water recirculation systems, because of their inherent nature, are ideal media for rapid proliferation of certain microbial organisms. Legionella pneumophila is of particular concern but other bacterial and viral infections can and do occur therein.

DISCLOSURE OF INVENTION

The present invention is for the explicit purpose of treating potable water supply and water recirculation systems, in particular for the purpose of disinfecting high risk hot water recirculation systems. The apparatus of the present invention supplies electronically controlled amounts of copper and silver ions to the water in water supply and recirculating systems in order to control microbial growth.

The apparatus of the present invention is employed in combination with a water system including a water pipe defining a water pipe interior. The apparatus is for disinfecting water flowing through the water system.

The apparatus includes a water bypass line having a water bypass line interior in communication with the water pipe interior, a water bypass line inlet connected to the water pipe at a first water pipe location, and a water bypass line outlet at a second water pipe location.

A wye connector is positioned along the water bypass line and includes a first wye element having an upstream end and a downstream end defining a first wye element passageway in fluid-flow communication with the water bypass line interior.

A second wye element forms an obtuse angle with the first wye element upstream end and defines a second wye element interior in fluid-flow communication with the first wye element passageway and the water bypass line interior.

Closure means is releasably connected to the second wye element to close the wye element and seal off the second wye element interior at a location spaced from the first wye element.

The apparatus also includes spaced, elongated, double-ended electrode elements. Each of the electrode elements is connected to the closure means at a mounting end thereof. Each electrode element projects into the second wye element interior and has a distal end adjacent to the first wye element passageway.

Electric power supply means is employed to provide electrical energy to the electrode elements and cause the release of ions from the electrode elements into turbulent water within the second wye element interior received from the water bypass line interior.

Other features, advantages, and objects of the present invention will become apparent with reference to the following description and accompanying drawings.

BRIEF DESCRIPTION OF DRAWINGS

FIGS. 7 and 7A through 7I illustrate a detailed circuit diagram of the power supply employed in the apparatus, FIGS. 7A through 7I illustrating different segments of the detailed circuit diagram and FIG. 7 illustrating the overall relationship of such segments; and FIGS. 8, 8A and 8B disclose a schematic illustrating a display panel circuit employed in the apparatus, FIG. 8 illustrating the overall relationship of the circuit segments shown in FIGS. 8A and 8B.

BEST MODE FOR CARRYING OUT THE INVENTION

Figure 1:
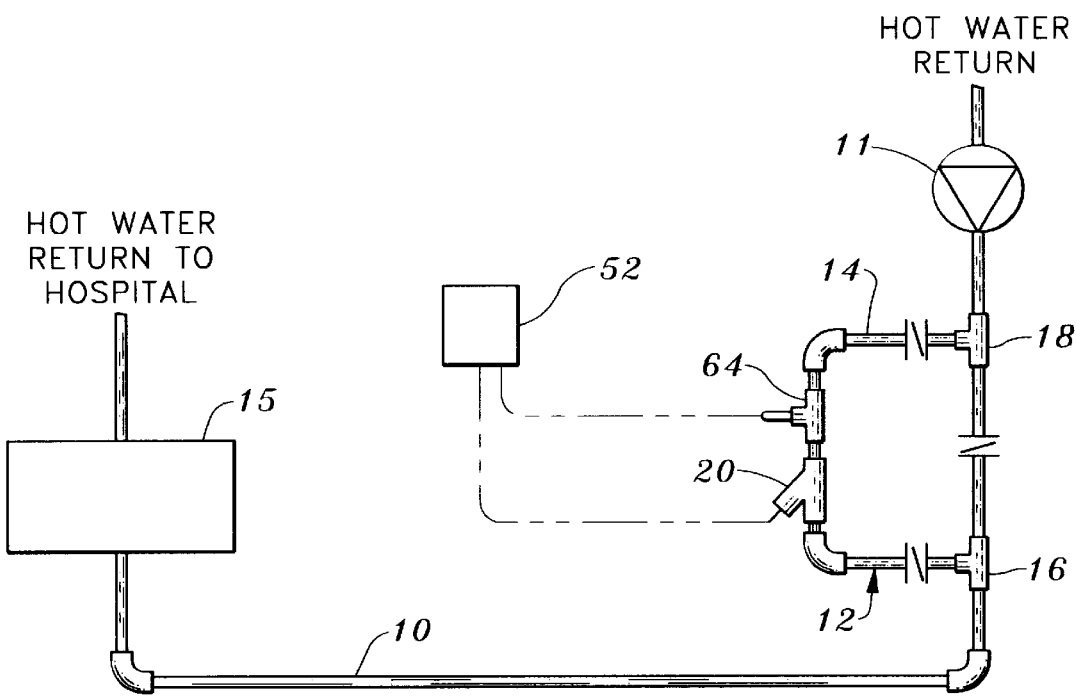
FIG. 1 is a schematic view illustrating the relationship of the apparatus of the present invention in combination with a hot water recirculation system.
Figure 2:
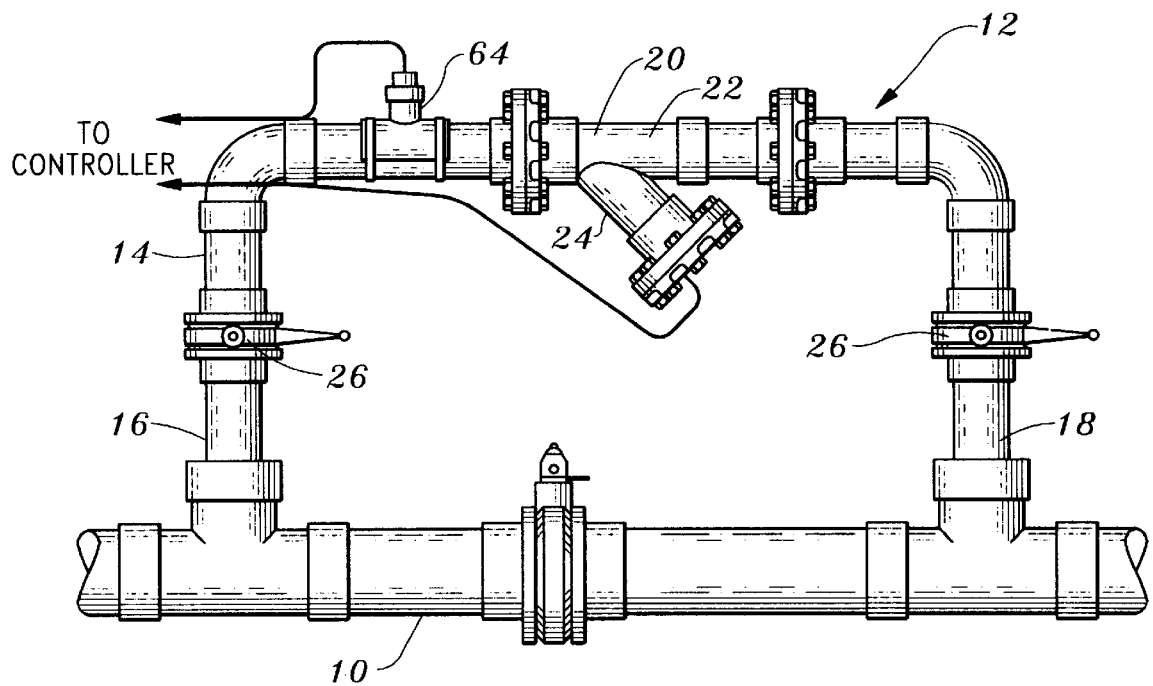
FIG. 2 is a side view of the water bypass line and related structure of the present invention operatively associated with a section of hot water recirculation system pipe.

Referring now to the drawings, and particularly FIGS. 1 and 2, a hot water pipe 10 of a conventional hot water recirculation system of the type commonly employed in hospitals and other institutions is illustrated. In the disclosed arrangement, a booster pump 11 and a hot water storage tank 15 are incorporated in the system. Apparatus constructed in accordance with the teachings of the present invention for disinfecting hot water circulating through the water recirculation system is generally designated by reference numeral 12.

Apparatus 12 includes a water bypass line 14 which may be formed of any suitable material such as "C" scale (heat resistant) polyvinyl chloride (CPVC). Water bypass line 14 defines a water bypass line interior in communication with the water pipe interior. Water bypass line 14 has an inlet 16 connected to pipe 10 at a first water pipe location and a water bypass line outlet 18 at a second water pipe location downstream from the first location. Butterfly valves 26 control the water flow through the water bypass line.

A wye connector 20 is positioned in the water bypass line, the wye connector also being suitably formed of CPVC.

Wye connector 20 has a 45 degree "Y" configuration. The wye connector includes a first, straight wye element 22 having an upstream end and a downstream end in general alignment with the water bypass line and defining a first wye element passageway generally coaxial with the water bypass line interior and in fluid-flow communication with the water bypass line interior.

A second wye element 24 forms an obtuse angle (135 degrees in the disclosed embodiment) with the first wye element upstream end. It may be seen that the orientation of the angled "Y" is such that the flow of hot water in the bypass line is forced into the aperture of the wye connectors wye element intersection during flow. This configuration creates water turbulence which enhances the distribution of metal ions produced by the apparatus in a manner which will be described in greater detail below.

Furthermore, the water turbulence operates to minimize scale build-up on the electrode elements of the apparatus. Such build-up is a common problem with electrodes in prior art water treatment systems. By way of contrast, the disclosed approach utilizing a wye configuration oriented in a specific manner is highly effective in the distribution of disinfectant in the form of metal ions and creates an essentially self cleaning environment. Furthermore, removal and replacement of electrode elements employed in the apparatus is facilitated in a manner which will be described below.

A closure is releasably connected to the second wye element 24 to close the second wye element and seal off the second wye element interior at a location spaced from the first wye element.

Figures 3, 4:
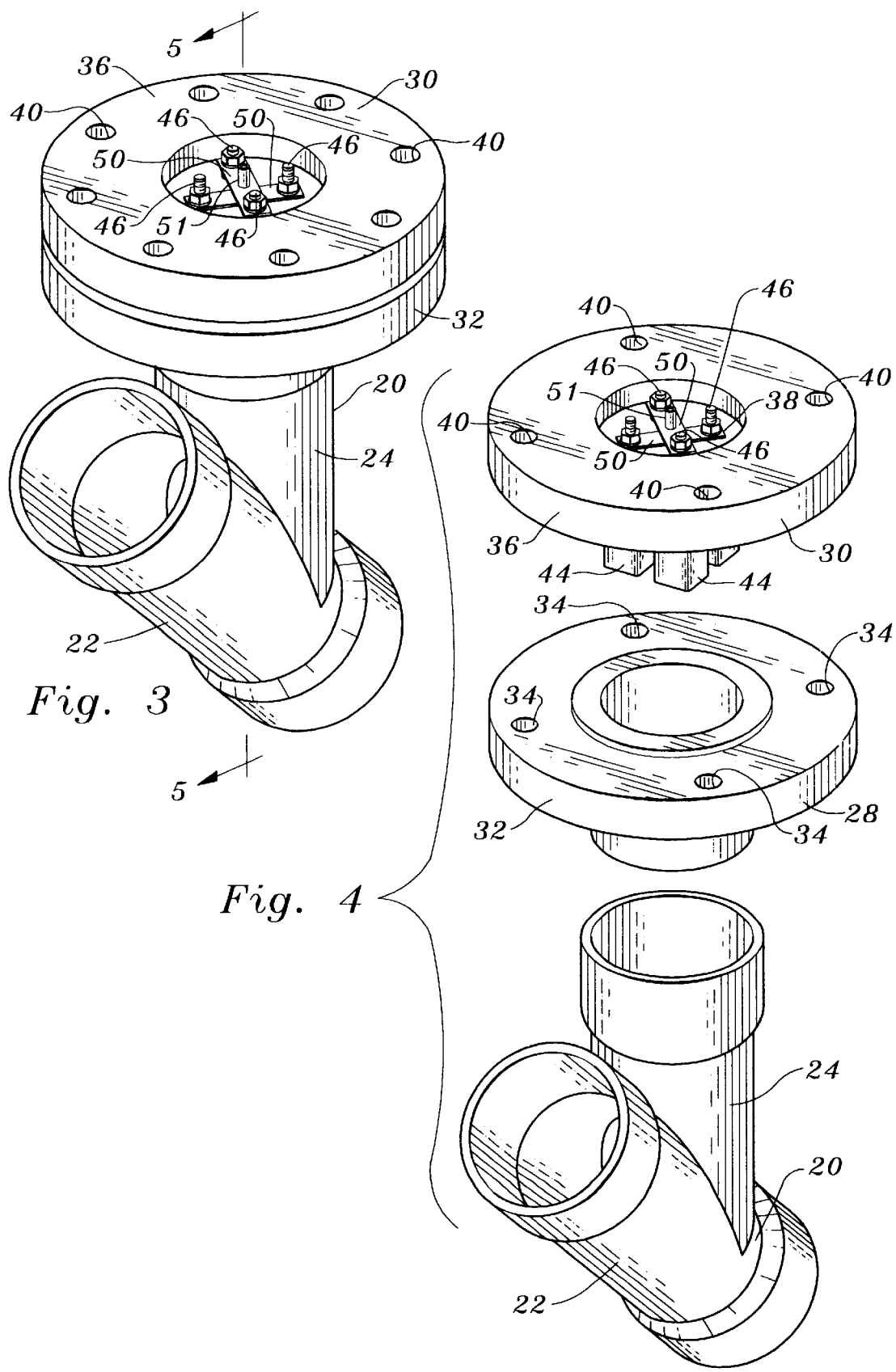
FIG. 3 is a perspective view of a wye connector, closure, and electrode element connectors employed in the apparatus.
FIG. 4 is an exploded, perspective view of the components shown in FIG. 3.
Figure 5:
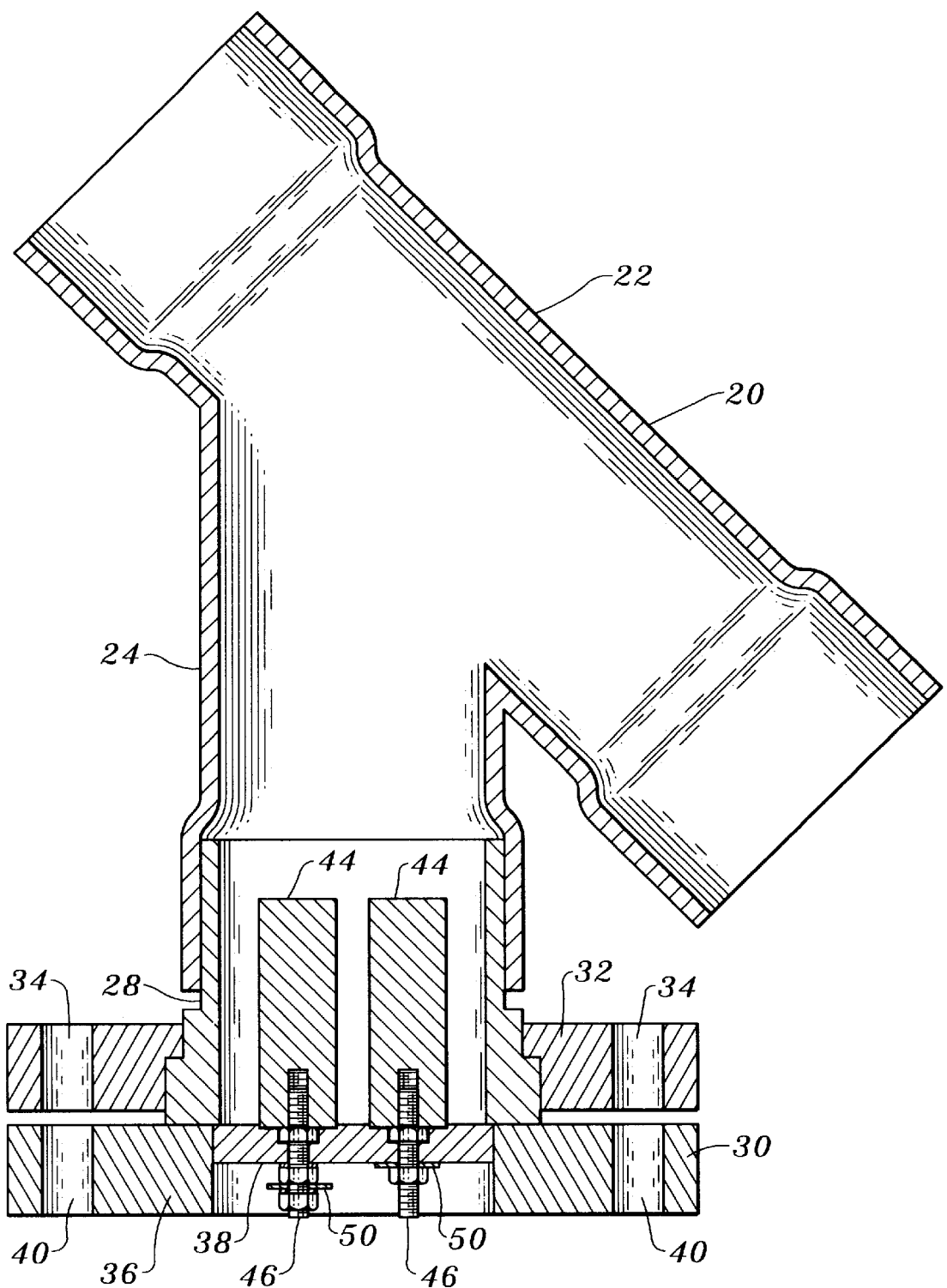
FIG. 5 is a cross-sectional view taken along the line 5—5 in FIG. 3.

The closure includes a first closure element 28 and a second closure element 30 as shown in FIGS. 3–5, the closure elements also being suitably constructed of CPVC. One end of first closure element 28 is received within the distal end of second wye element 24 and secured therein by any desired expedient such as adhesive. First closure element 28 includes a flange 32 projecting from the distal end of the main first closure element body or central portion. Openings 34 are formed in the flange 32.

Second closure element 30 has a flange 36 projecting from the central portion 38 thereof. Holes 40 are formed in flange 36 and mechanical fasteners in the form of nuts and bolts are utilized to secure the flanges together in the manner illustrated in FIG. 4. Separation of the closure elements is readily accomplished by undoing the mechanical fasteners and withdrawing the second closure element from the first closure element.

Projecting outwardly from the inner side of second closure element 30 are spaced, elongated, double-ended electrode elements 44 suitably formed of a copper/silver alloy. The electrode elements 44 are four in number and are mounted at the ends thereof to the central portion 38 of second closure element 30 by threaded shafts 46 threadedly secured to the ends of the electrode elements and projecting through openings formed in second closure element central portion 38. Nuts 48 are threadedly secured to the threaded shafts 46 at the external surface of the central portion to maintain the electrode elements and shafts in position. A unitary structure including the electrode elements and second closure element is thus created. The electrode elements project into the second wye element interior and have distal ends adjacent to the first wye element passageway.

The outer ends of the threaded shafts 46 pass through holes formed in electrode element connectors in the form of elongated flat connector plates 50. The connectors 50 are separated from one another, the connectors 50 being mounted on a common central shaft 51 but being maintained electrically insulated from one another.

Each connector 50 has two holes for receiving the ends of threaded shafts 46 and since the connectors are oriented 90 degrees with respect to one another, the threaded shafts and the electrode elements attached thereto are positioned in such configuration, two of the electrode elements being electrically connected to one connector and two of the two other electrode elements being connected to the other connector. Thus, the electrode elements are in two discrete sets, each set comprising two of the electrode elements. The electrode elements of the sets form a staggered pattern, with the electrode elements of one of the sets being interposed between the electrode elements of the other of the sets.

Figure 6:
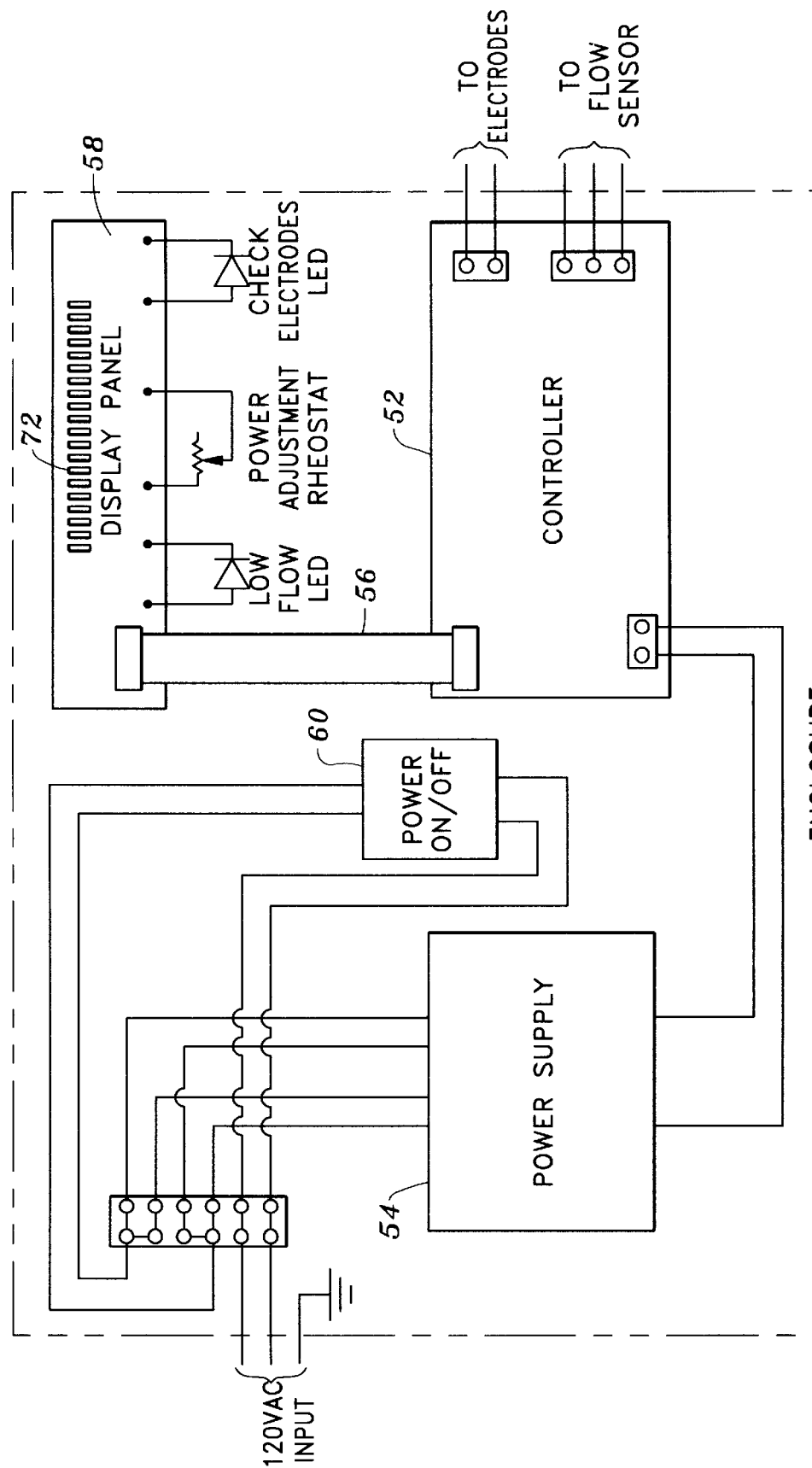
FIG. 6 is a general schematic of the water treatment apparatus.
Figure 7A:
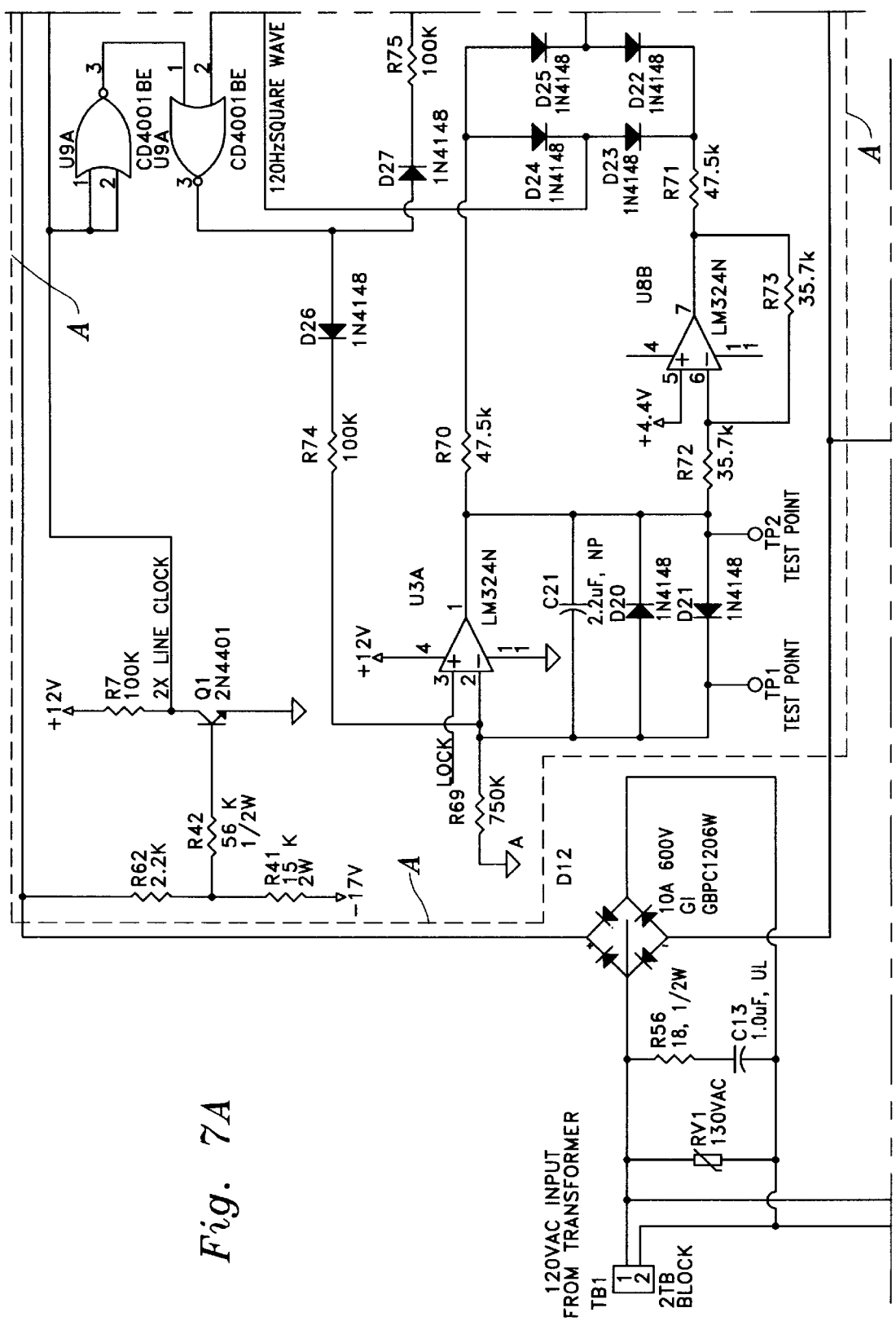
Figure 7B:
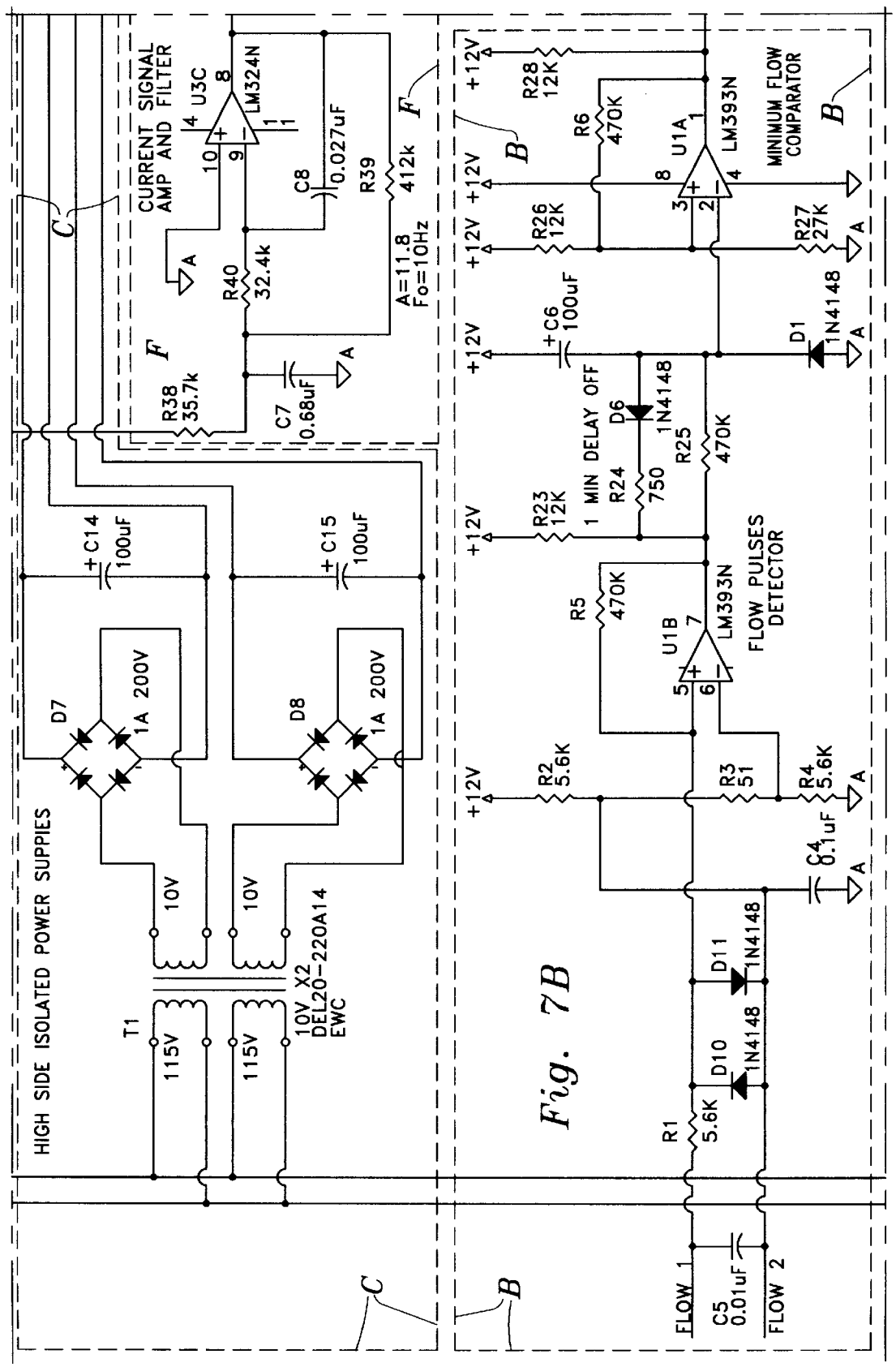
Figure 7C:
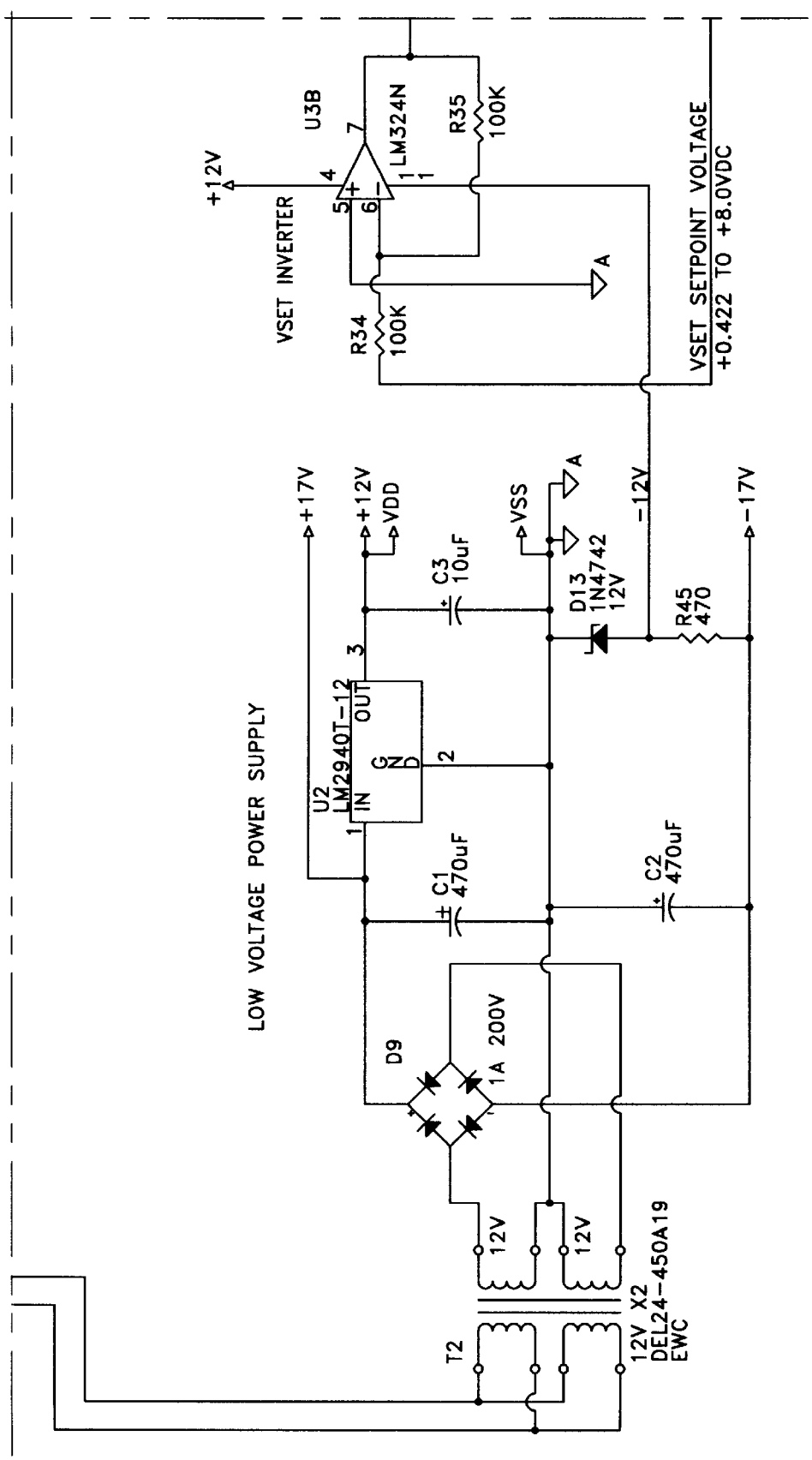
Figure 7D:
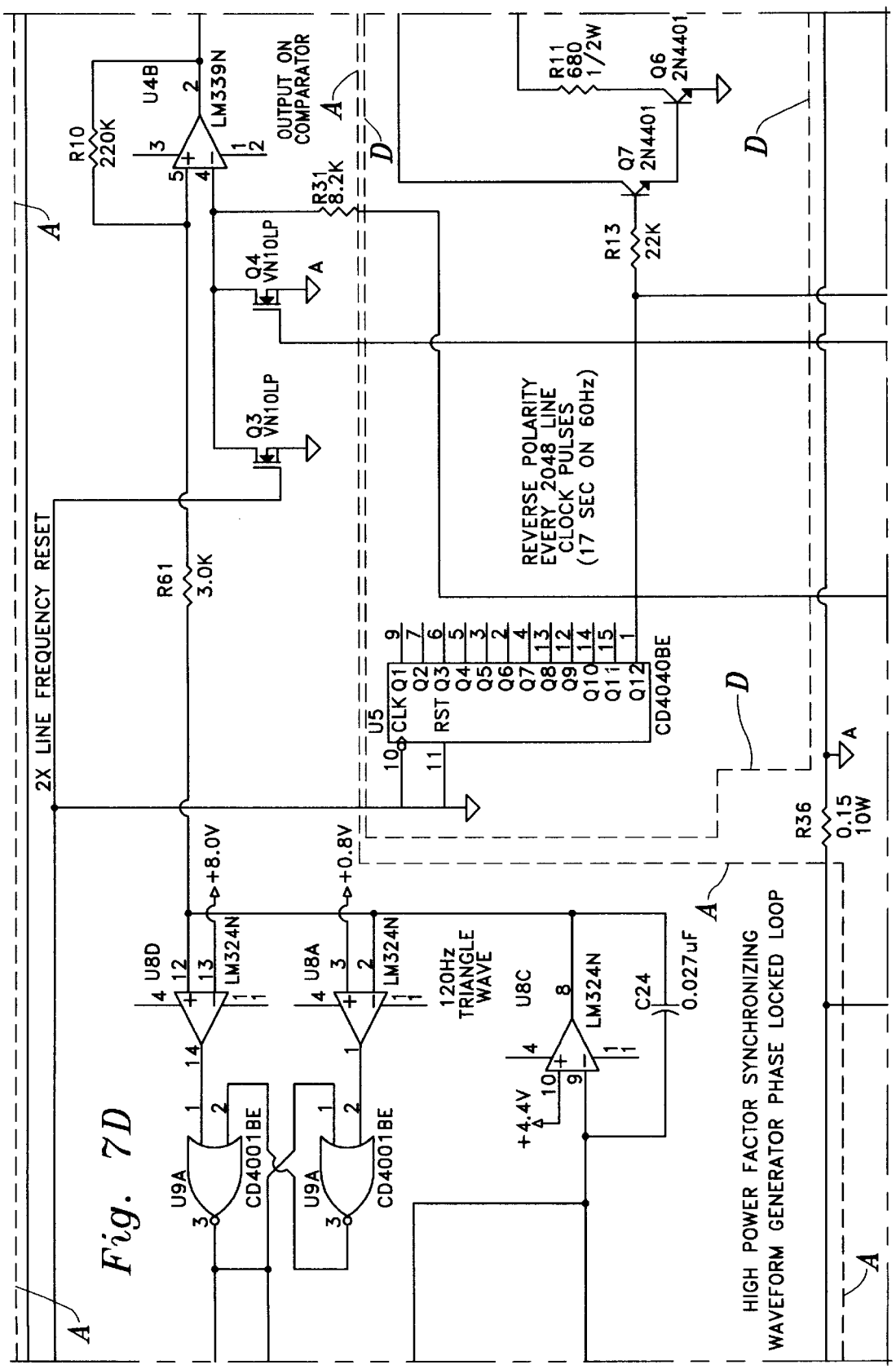
Figure 7E:
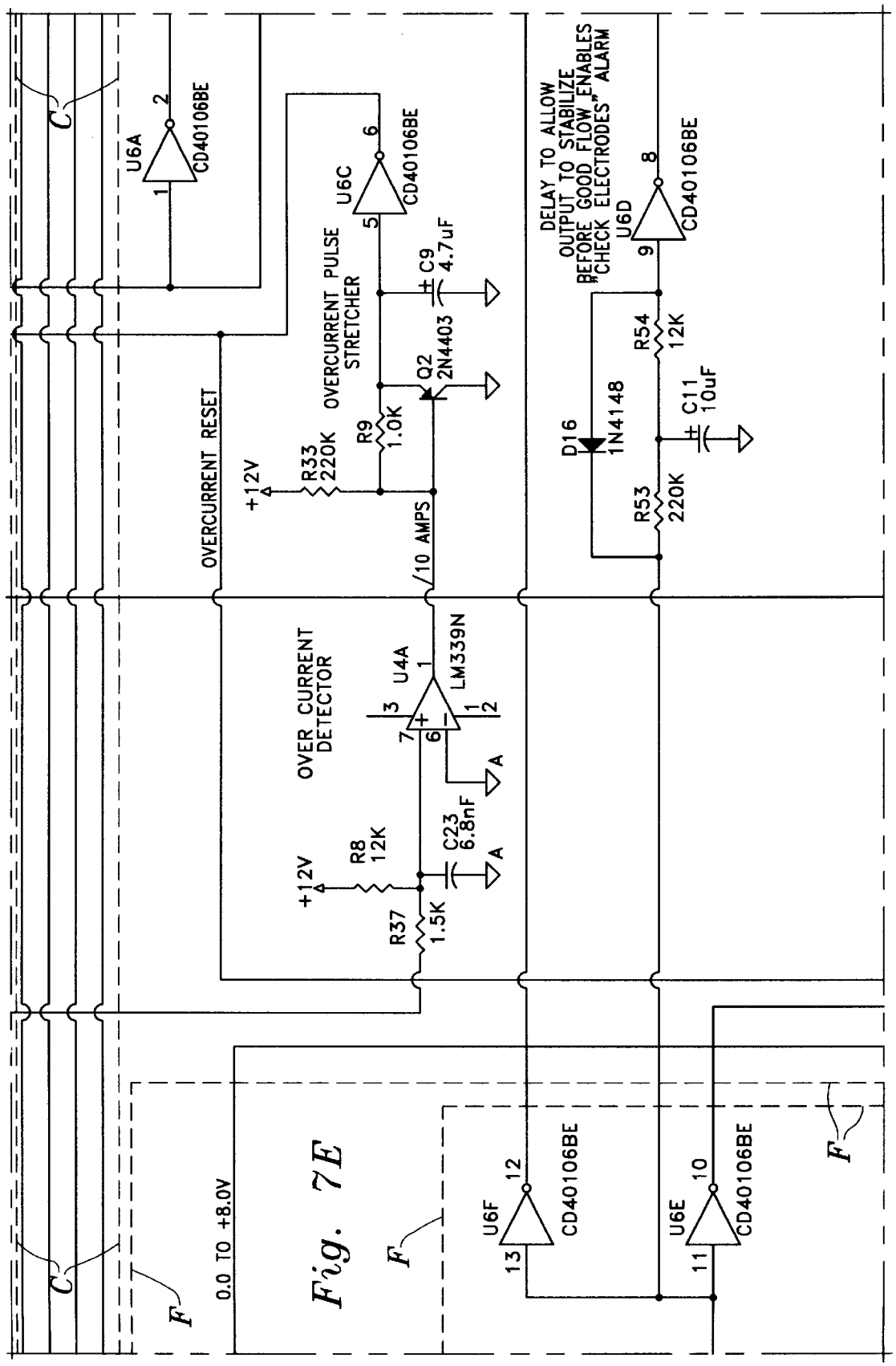
Figure 7F:
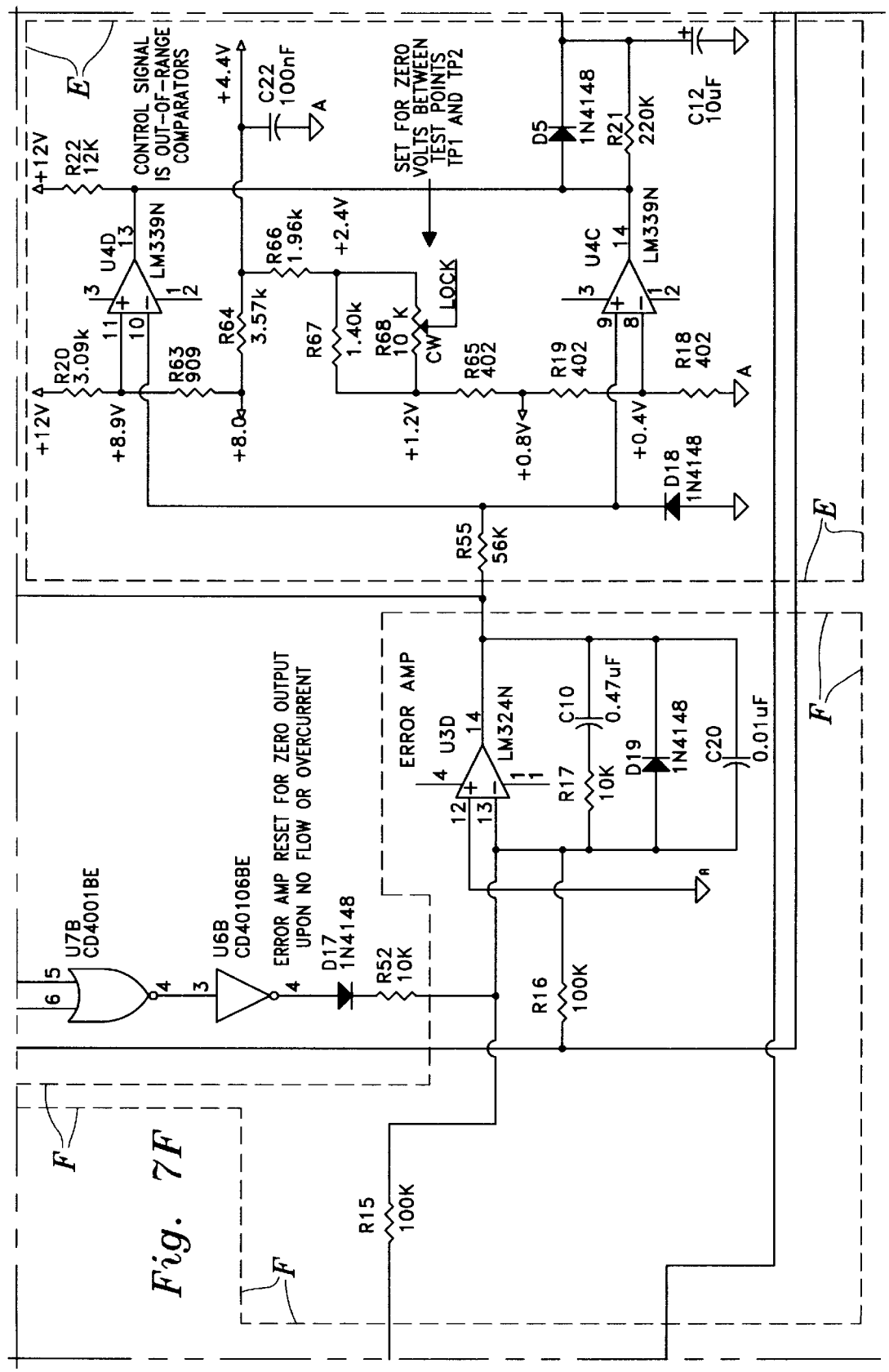
Figure 7G:
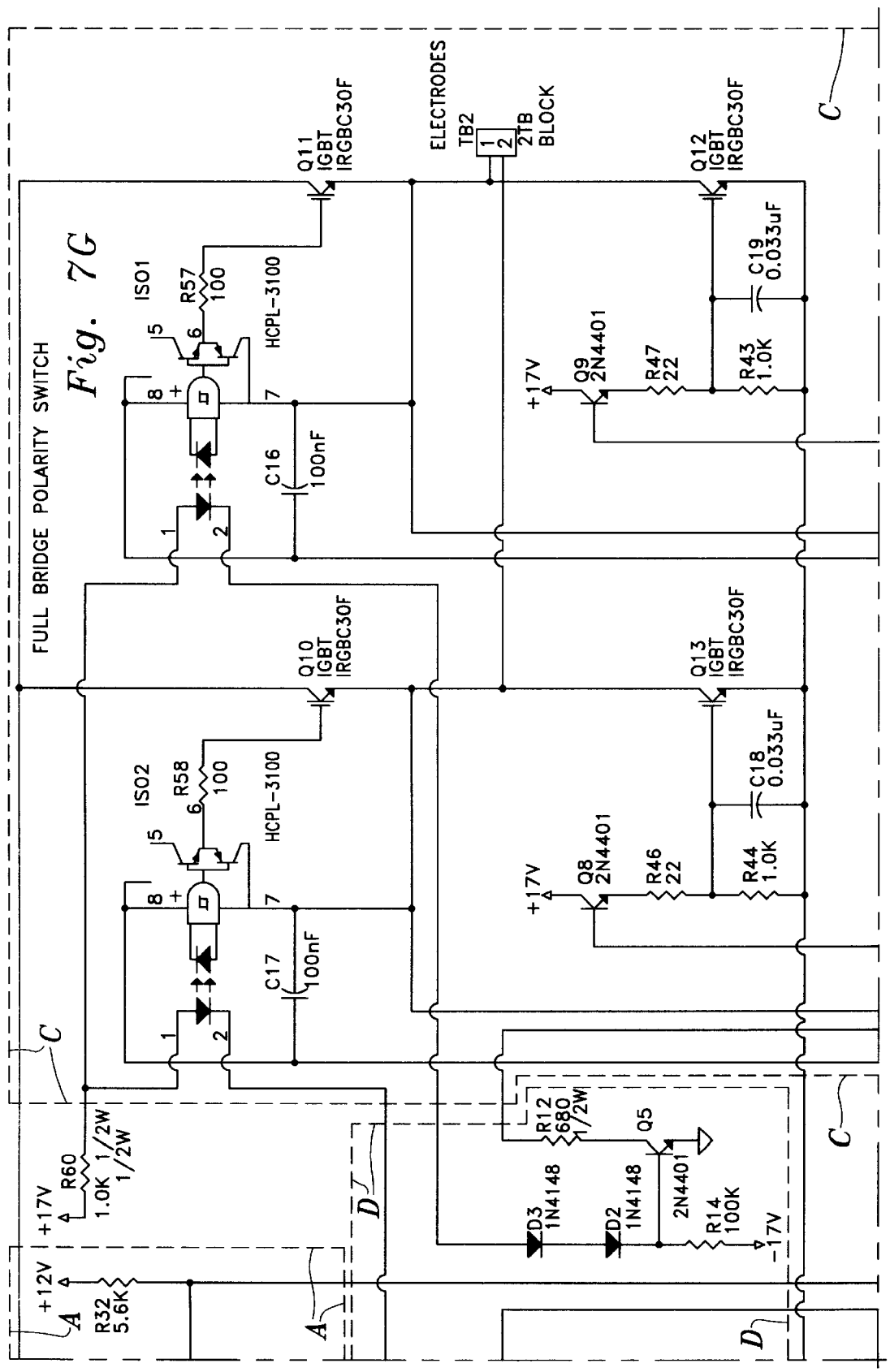
Figure 7H:
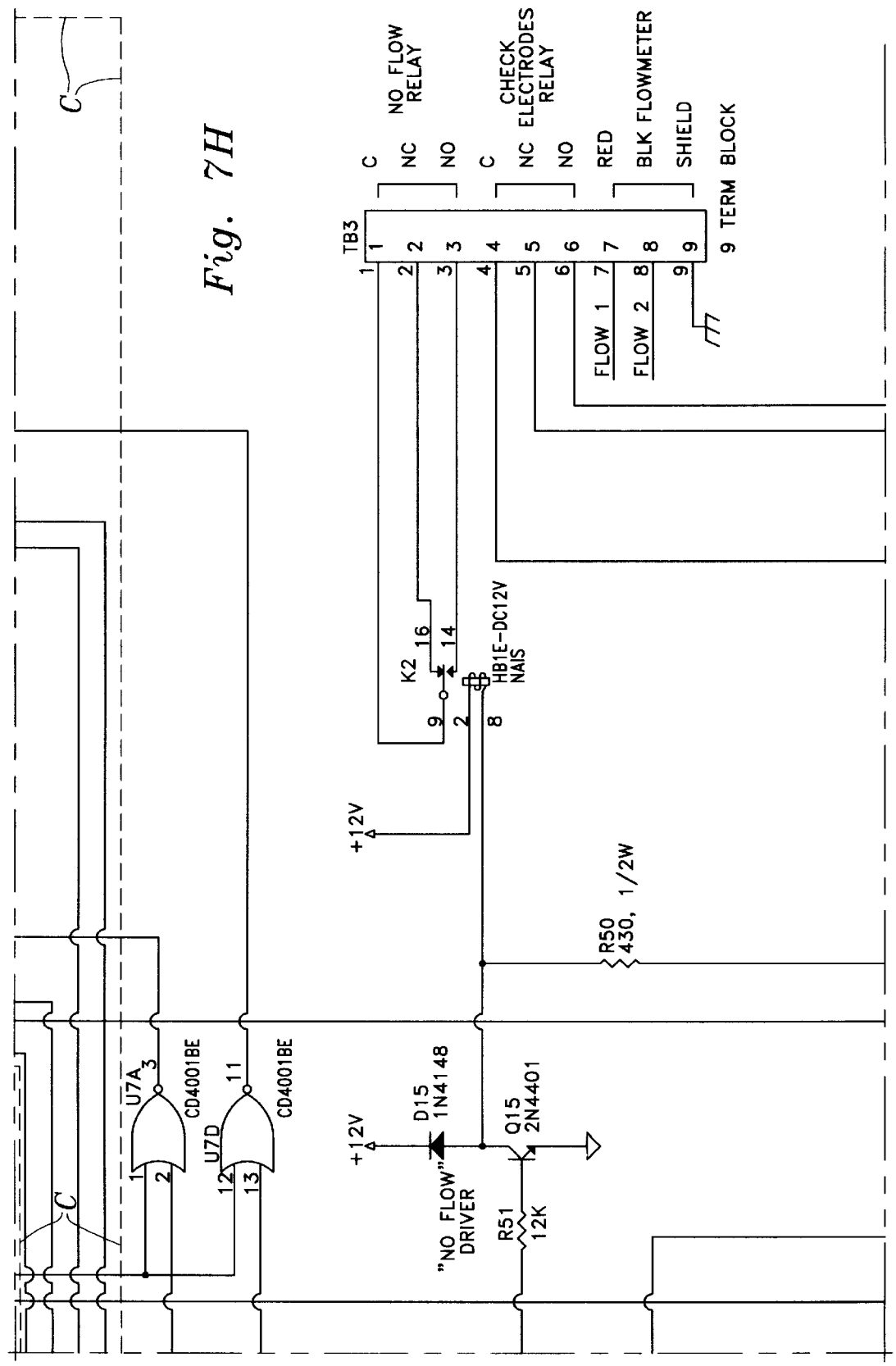
Figure 7I:
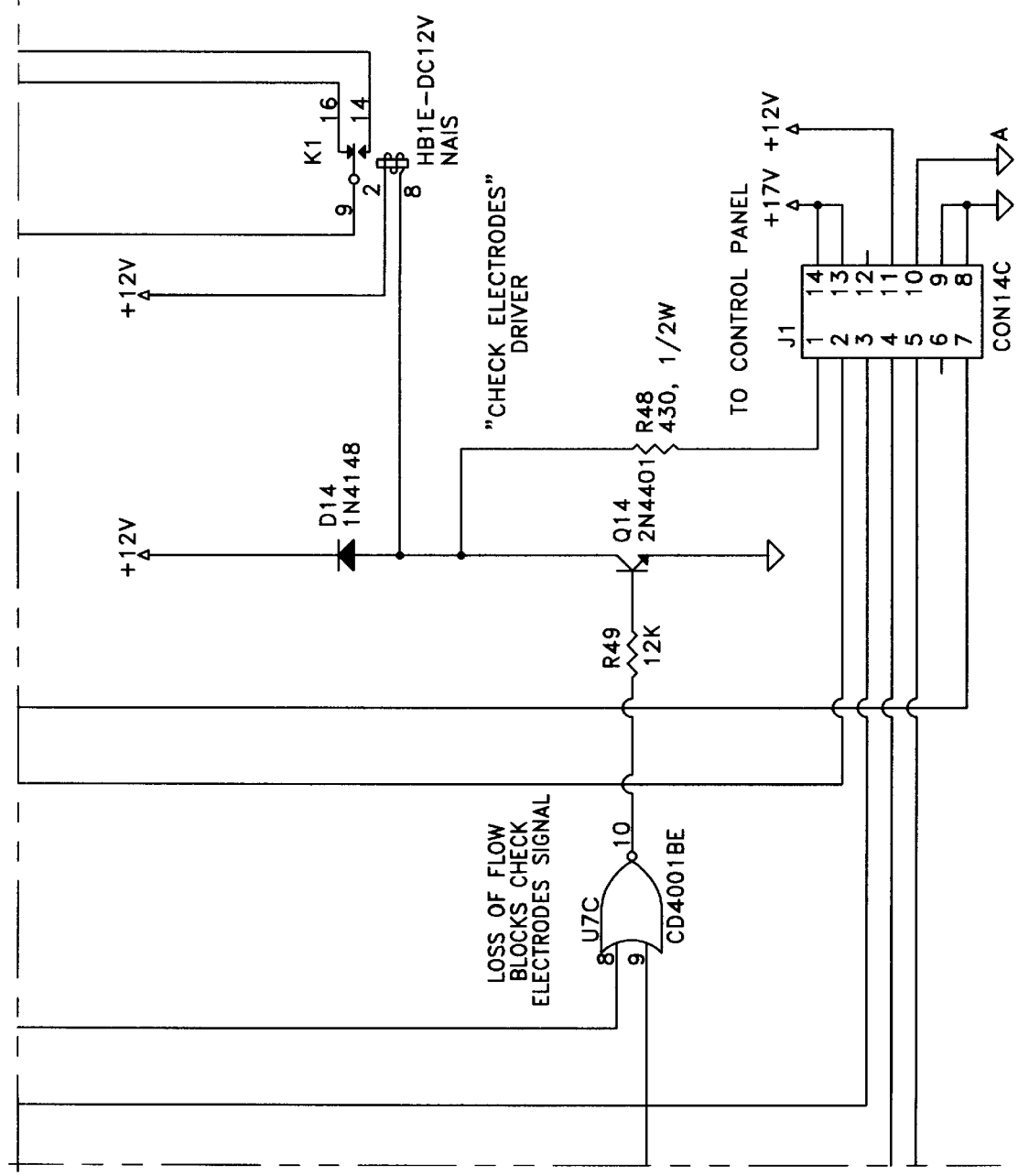

Each of the connectors 50 is electrically connected by wiring (not shown) to a controller 52 in the form of a suitably designed hardwired controller circuit or, alternatively, in the form of a suitable programmed central processing unit (CPU) and thence to power supply means 54. See, in particular, FIGS. 6, and 7, and 7A through 7I in this regard, FIG. 6 showing the general schematic employed and FIGS. 7 and 7A through 7I being a disclosure of the detailed circuitry of the power supply. A cable 56 (FIG. 6) interconnects the controller 52 to a display panel 58 which is suitably located on a control housing (not shown).

The power supply means 54 provides electrical energy to the electrode elements and causes the release of ions from the electrode elements into the turbulent water within the second wye element interior which is received from the water bypass line interior, such turbulence being created as discussed above due to the particular orientation of the second wye element relative to the water flow through the water bypass line and first wye element.

Again with reference to FIG. 6, starting from the 120 VAC input, hot and neutral DC wires are connected to TB1. From TB1 the 120 VAC is connected to the power on/off switch and circuit breaker 60 and then back to TB1, where they are paralleled into two pairs and sent to two separate inputs of the power supply 54, which is in the form of a dual primary transformer, the two pairs of input wires allowing the unit to operate on either 120 VAC or 240 VAC.

The power supply regulates the line (supply) voltage using symmetrical phase controlled switching. This feature automatically adjusts for inconsistencies in the power factor and maintains it at near unity. This is accomplished by the section of the power supply circuit delineated by dash lines and designated by reference letter A.

AC power from the transformer is rectified and fed to the "H" bridge in the controller. A synchronizing signal from the AC input is used to correct the power factor to nearly unity. In detail, the AC full-wave rectified input is used to generate a synchronizing pulse at every zero crossing (120 Hz in the U.S.A.). This pulse is used to force a triangle wave oscillator to run in phase-lock with twice the line frequency (100 or 120 Hz or something else if portable or remote power). The triangle wave is compared to an error signal and the results used to turn on the "H" bridge. For low electrode current settings, the triangle wave will be less than the error signal for only a short time. This time is symmetrical about the zero crossing. When the triangle wave is less than the error signal the "H" bridge is ON. So, for small current settings the electrodes will have full-wave rectified DC applied to them beginning a little before and ending a little after the zero crossing. For larger amounts of electrode current the total phase angle of the ON time increases. At a high current setting the electrodes will have a greater amount of the full-wave rectified power applied.

In the power supply circuit is a solid state full "H" bridge, current reversing, rectifier circuit delineated by dash lines and designated by the letter C. This also accomplishes the task of periodically reversing current to the electrodes which is an essential part of the operation of the system.

In the arrangement illustrated, two of the electrode elements will be positive and two of the electrode elements will be negative since the electrode elements mounted on a common connector 50 will always have the same polarity. The reversal of polarity promotes even diminishment of the electrode elements during operation of the apparatus.

From the power supply 54 the rectified voltage is fed to the controller 52. Controller 52 sends and receives control signals to and from the display panel 58, sends controlled alternating low voltages to the electrode elements, and receives a shut off control signal from a flow meter or flow sensor 64 incorporated in the apparatus.

The flow meter 64 is located upstream of wye connector 20 (to the left of the wye connector as viewed in FIG. 2). The flow meter may be of any suitable type such as an induction driven flow meter oriented perpendicularly to the flow line and is electrically connected to the controller 52 to indicate the presence of water flow. The magnetic induction type flow sensor will generate a signal even at very low flows. A circuit in the controller detects the absence of flow and will shut off the electrode power if no flow is detected for a predetermined period, such a 1 minute or more, to prevent damage and/or a localized build-up of copper and silver. More particularly, the portion of the circuitry relating to this function in the power supply circuit is delineated by dash lines and designated by reference letter B.

The LOW FLOW LED associated with display panel 58 is energized when the signal from the flow meter to the controller drops below an established minimum threshold of water flow.

Another indicator associated with the display panel is a CHECK ELECTRODES LED which is energized when the controller senses an abnormal demand for more electrode voltage to meet the setpoint current. The inability to provide the required current, even at maximum electrode voltage, generally means insufficient conductivity between the electrodes due to lack of conductivity between the electrodes. This is normally caused by electrode depletion or excessive scaling. Other causes could be an open electrode wire or exceptionally low Total Dissolved Solids (T.D.S.) in the water.

Figure 8A:
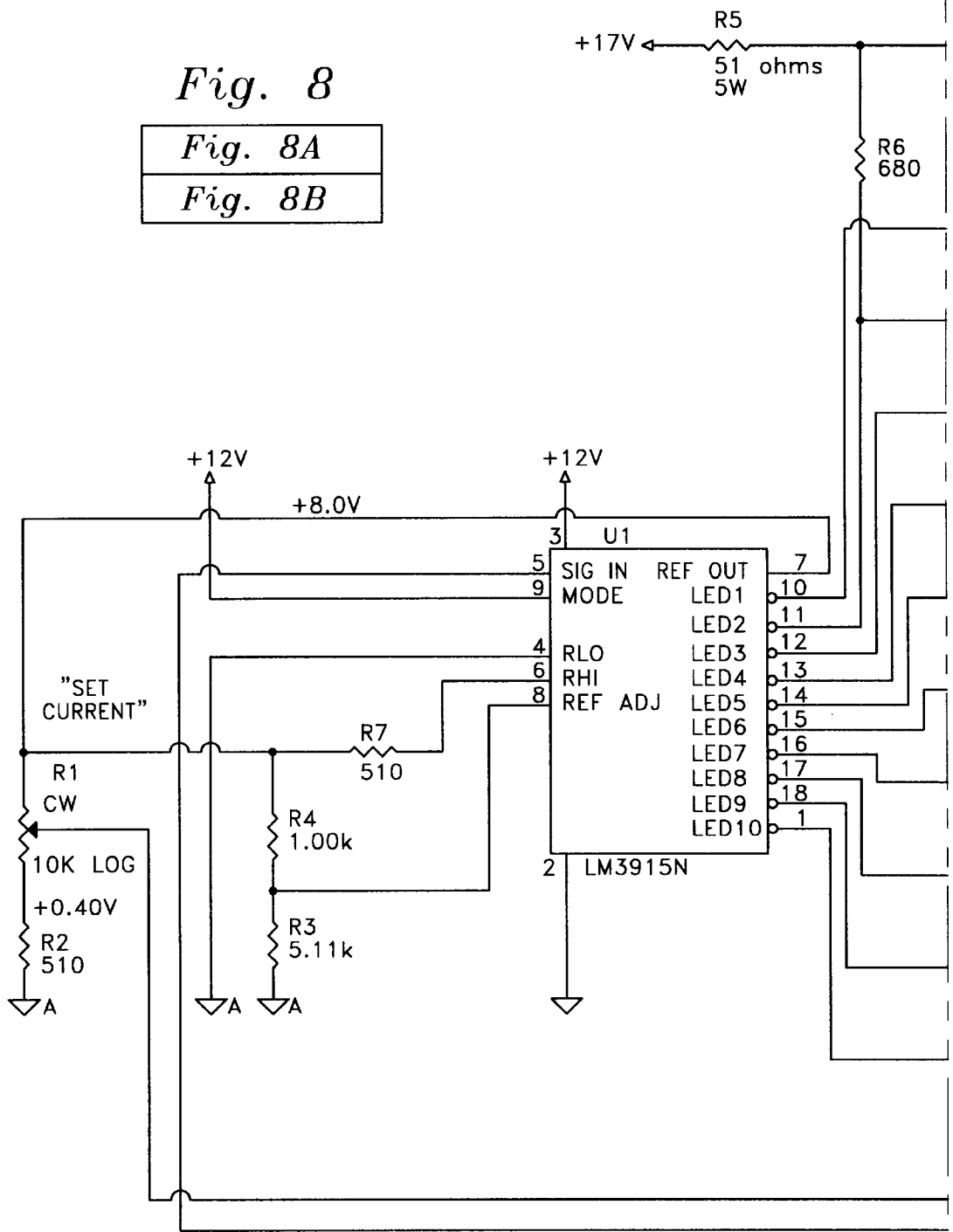
Figure 8B:
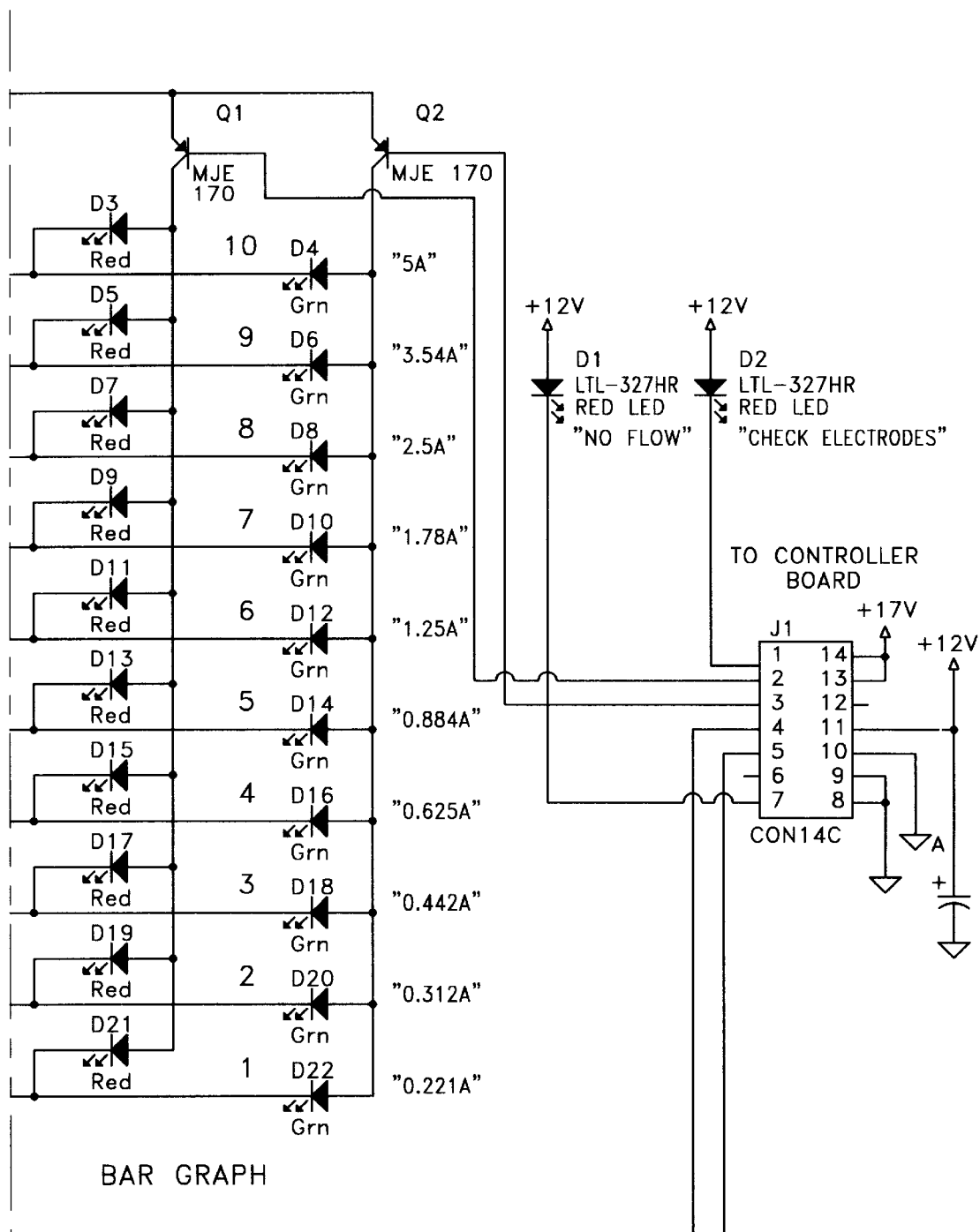

The display panel 58 also incorporates an electrode output/polarity meter which indicates power supply to the electrodes as well as the output polarity which alternates, for example, every seventeen seconds. This circuitry portion is delineated by dash lines and designated by reference letter D. The meter 72 is a 20 LED array logarithmic bar graph display with a sensitivity of 22:1. FIGS. 8, 8A and 8B together are a schematic of the display panel circuit. The LEDs in the display can be color coded to indicate polarity.

The controller will automatically reactivate when flow is restored. A power adjustment rheostat located adjacent to the display panel can be used by the operator to adjust the level of power output.

As mentioned above, the circuitry employed in the apparatus operates to maintain the power factor near unity. Electrical utilities are critical of equipment having either leading or lagging power factors. A poor power factor means more line current flow than is necessary to do the work. In the arrangement disclosed here, this is accomplished not with a high frequency switching power supply, but by employing a symmetrical phase controlled switching arrangement to vary the power output. This is more reliable than high frequency switching and produces less electromagnetic noise. In operation at low power the output voltage is produced by only a small amount of the incoming line voltage switched on just before the zero crossing and off just after the zero crossing. As more output power (current) is requested by the user controlled potentiometer, the output is switched into the line voltage earlier before the zero crossing and an equal amount later after the zero crossing. This balanced before/after zero crossing switching produces a unity power factor.

The above-described logarithmic bar graph display is a valuable feature. Since the real analog world has a wide dynamic range, it is desirable that the user of the apparatus should be able to set the output current over a wide range also. By using a logarithmic potentiometer for the user control in a commercial logarithmic 10 dot bar graph display integrated circuit, the user has over a 22:1 adjustment range as opposed to a 10:1 range if linear control/display were used.

The solid state current reversing feature of the invention is also important. By employing just four power transistors, and the drivers, arranged in a full "H" bridge, both the periodic reversal of current to the electrodes is accomplished along with the previously discussed power factor correct switching technique. The use of transistors is more reliable than a relay due to the millions of reversals during the product life. Transistors also allow for the incorporation of an electronic "circuit breaker" which can act nearly instantaneously in case of an electrode element short circuit.

The control circuits in the apparatus are designed to maintain the current set by the user even though there may be line voltage variations, water conductivity variations, and reductions in electrode surface area. Given that voltage and conductivity remain relatively constant at any particular installation, only electrode wear is a significant factor. In operation, as the electrode surface area shrinks, the electronics delineated by dash lines and designated by reference letter F compensates by increasing the applied voltage. Once the maximum available voltage is applied, the circuit delineated by dash lines and designated by reference letter E can no longer control the current and actuates the check electrodes LED associated with the display panel.

I claim:

1. In combination:
    a water system including a water pipe defining a water pipe interior; and apparatus for disinfecting water flowing through said water system, said apparatus including a water bypass line having a water bypass line interior in communication with said water pipe interior, a water bypass line inlet connected to said water pipe at a first water pipe location, and a water bypass line outlet at a second water pipe location, a wye connector positioned along said water bypass line and including a first wye element having an upstream end and a downstream end defining a first wye element passageway in fluid flow communication with the water bypass line interior and a second wye element forming an obtuse angle with said first wye element upstream end and defining a second wye element interior in fluid flow communication with said first wye element passageway and said water bypass line interior, closure means releasably connected to said second wye element to close said second wye element and seal off said second wye element interior at a location spaced from said first wye element, spaced, elongated, double-ended electrode elements, each of said electrode elements connected to said closure means at a mounting end thereof, projecting into said second wye element interior, and having a distal end adjacent to said first wye element passageway, and electric power supply means for providing electrical energy as voltage to said electrode elements and causing the release of ions from said electrode elements into turbulent water within said second wye element interior received from said water bypass line interior, said power supply means including polarity reversal means for periodically reversing the polarity of said electrode elements, electrode element connector means independently interconnecting two discrete sets of electrode elements to said power supply means, each set of electrode elements comprising a plurality of electrode elements, and said plurality of electrode elements of one of said sets all being positive and said plurality of the other of said sets all being negative during energization, said electrode element connector means comprising a first electrically conducting element attached to said closure means and a second electrically conducting element attached to said closure means, said first and second electrically conducting elements being insulated from one another, and the electrode elements of one set of electrode elements being attached to said first electrically conducting element and the electrode elements of said other set of electrode elements being attached to said second electrically conducting element, said closure means including a first closure element partially located in said second wye element interior and secured to said second wye element, said first closure element including a flange disposed externally of said second wye element, and a second closure element including a flange releasably connected to the flange of said first closure element, said first and second electrically conducting elements positioned on said second closure element whereby said electrode elements will be removed from said second wye element interior when said second closure element is disconnected and removed from said first closure element.

2. The combination according to claim 1 wherein the electrode elements of said sets form a staggered pattern with the electrode elements of one of said sets being interposed between the electrode elements of the other of said sets.

3. The combination according to claim 1 wherein said first and second electrically conducting elements define a plurality of spaced openings, said apparatus additionally comprising mechanical, fastener means extending from the mounting ends of said electrode elements, through the openings in said first and second electrically conducting elements and secured to said first and second electrically conducting elements.

4. The combination according to claim 1 additionally comprising mechanical fasteners extending through the flanges of said first and second closure elements to releasably connect said flanges.

5. The combination according to claim 1 wherein said power supply means includes symmetrical phase controlled switching means for maintaining the voltage provided substantially at unity.

6. The combination according to claim 1 additionally comprising flow sensor means connected to said water bypass line for sensing the flow of water through said water bypass line, said flow sensor means in operative association with said power supply means to de-energize said electrode elements when said flow sensor means senses cessation of water flow through said water bypass line.

7. The combination according to claim 1 wherein said apparatus additionally comprises visual display means operatively associated with said power supply means and said electrode elements for displaying the voltage applied to said electrode elements by said power supply means and the polarity of said electrode elements.

8. The combination according to claim 7 wherein said visual display means includes a logarithmic bar graph display.

9. The combination according to claim 1 wherein said polarity reversal means comprises solid state circuitry including four power transistors and drivers for said four power transistors arranged in a full "H" bridge.

10. The combination according to claim 1 wherein said power supply means includes means for increasing the voltage applied to said electrode elements responsive to diminishment of the sizes of said electrode elements.

11. The combination according to claim 10 additionally comprising signal means in operative association with said power supply means for signaling when the voltage applied to said electrode elements exceeds a determined value.

12. The combination according to claim 1 additionally comprising valve means for controlling the flow of water through said water bypass line.

13. The combination according to claim 1 including means for adjusting the voltage provided to said electrode elements by said power supply means.

* * * * *